US012189852B2

(12) United States Patent
Liu et al.

(10) Patent No.: US 12,189,852 B2
(45) Date of Patent: Jan. 7, 2025

(54) WEARABLE MOTION CAPTURE GLOVE BASED ON FLEXIBLE OPTICAL FIBER

(71) Applicant: Nanchang Hangkong University, Nanchang (CN)

(72) Inventors: Bin Liu, Nanchang (CN); Qi Wang, Nanchang (CN); Xiyou Liang, Nanchang (CN); Tiancheng Dong, Nanchang (CN); Zijing Ding, Nanchang (CN); Yuandong Xie, Nanchang (CN); Mengdi Miao, Nanchang (CN); Libo Tan, Nanchang (CN); Yuxin Chen, Nanchang (CN); Duo Xu, Nanchang (CN); Qinyang Song, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 0 days.

(21) Appl. No.: 18/406,618

(22) Filed: Jan. 8, 2024

(65) Prior Publication Data

US 2024/0411366 A1     Dec. 12, 2024

(30) Foreign Application Priority Data

Jun. 9, 2023    (CN) ........................ 202310681188.X

(51) Int. Cl.
*G06F 3/01*         (2006.01)
*G06F 3/03*         (2006.01)
*G06F 3/0346*      (2013.01)
*G06F 3/038*       (2013.01)

(52) U.S. Cl.
CPC ............ *G06F 3/014* (2013.01); *G06F 3/0304* (2013.01); *G06F 3/0346* (2013.01); *G06F 3/038* (2013.01); *G06F 2203/0384* (2013.01)

(58) Field of Classification Search
None
See application file for complete search history.

(56) References Cited

FOREIGN PATENT DOCUMENTS

| CN | 109116986 B | * | 5/2021 | ............. G06F 3/017 |
| CN | 114770571 A | * | 7/2022 | ............. B25J 13/08 |

\* cited by examiner

*Primary Examiner* — Ifedayo B Iluyomade
(74) *Attorney, Agent, or Firm* — Stinson LLP

(57) ABSTRACT

Disclosed is a wearable motion capture glove based on a flexible optical fiber, relating to the field of motion capture. The wearable motion capture glove includes a glove body, multiple motion acquisition sensing devices, and a glove packaging tool. Each motion acquisition sensing device includes a data acquisition and processing module, a circuit splint, and a flexible polymer profiled optical fiber. The data acquisition and processing module includes a motion capture data acquisition module, and a motion capture data processing module. The flexible optical fiber and the motion capture data acquisition module are firmly packaged using the circuit splint and the glove packaging tool, and then are fixed to a corresponding position of a finger joint of a wearer, such that the glove can be worn more closely to the finger joint, and data acquisition is more stable and accurate.

9 Claims, 7 Drawing Sheets

WEARABLE MOTION CAPTURE GLOVE BASED ON FLEXIBLE OPTICAL FIBER

CROSS-REFERENCE TO RELATED APPLICATION

This patent application claims the benefit and priority of Chinese Patent Application No. 202310681188.X, filed with the China National Intellectual Property Administration on Jun. 9, 2023, the disclosure of which is incorporated by reference herein in its entirety as part of the present application.

TECHNICAL FIELD

The present disclosure relates to the technical field of motion capture, and in particular to a wearable motion capture glove based on a flexible optical fiber.

BACKGROUND

At present, the accuracy of inertial sensors used in motion capture gloves is not high enough, and there are certain errors in use, leading to unstable data transmission. Flexible polymer profiled optical fiber (referred to as flexible optical fiber) can be used to detect curvature with high accuracy after sensitization processing due to its characteristics of high adhesion to human body, softness, high elasticity and high sensitivity, which is particularly suitable for motion capture of human body. However, when the flexible polymer profiled optical fiber is applied to motion capture gloves, the flexible optical fiber cannot be firmly fixed by ordinary slot fixing method due to its softness, smoothness and high adhesion to human body, leading to the interference of data collected during motion capture. Moreover, a binding mode between the motion acquisition sensor module and the optical fiber of the current motion capture glove is uncertain, and the packaging fixing mode of the motion acquisition sensor module and the optical fiber on the glove is not unique, resulting in unstable motion acquisition process.

SUMMARY

For the problems proposed in above background art, a wearable motion capture glove based on a flexible optical fiber is provided, so as to achieve accurate and stable acquisition and high-pose restoration of a hand motion and make the hand motion easier and nimbler.

To achieve the objective above, the present disclosure employs the following technical solution:

A wearable motion capture glove based on a flexible optical fiber provided by the present disclosure includes a glove body, multiple motion acquisition and sensing devices, and a glove packaging tool. Each motion acquisition and sensing device includes a data acquisition and processing module, a circuit splint, and a flexible polymer profiled optical fiber.

The data acquisition and processing module include a motion capture data acquisition module, and a motion capture data processing module. The motion capture data acquisition module includes a front laser emitting board, a central laser receiving and emitting board, and a rear laser receiving board. The circuit splint includes a front circuit splint, a central circuit splint, and a rear circuit splint. The flexible polymer profiled optical fiber includes a first flexible polymer profiled optical fiber, and a second flexible polymer profiled optical fiber.

One end of the first flexible polymer profiled optical fiber is connected to the front laser emitting board, and the other end of the first flexible polymer profiled optical fiber is connected to a laser receiving end of the central laser receiving and emitting board. One end of the second flexible polymer profiled optical fiber is connected to a laser emitting end of the central laser receiving and emitting board, and the other end of the second flexible polymer profiled optical fiber is connected to the rear laser receiving board.

The front circuit splint is used to fixedly connect one end of the first flexible polymer profiled optical fiber to the front laser emitting board in a pressing way, and is fixed to a middle phalanx position of the glove body after being packaged by the glove packaging tool. The central circuit splint is used to fixedly connect the other end of the first flexible polymer profiled optical fiber, the central laser receiving and emitting board and one end of the second flexible polymer profiled optical fiber in a pressing way, and is fixed to a proximal phalanx position of the glove body after being packaged by the glove packaging tool. The rear circuit splint is used to fixedly connect the other end of the second flexible polymer profiled optical fiber to the rear laser receiving board in a pressing way, and is fixed to a proximal metacarpal head position of metacarpal phalanx of the glove body after being packaged by the glove packaging tool.

The motion capture data processing module is connected to the motion capture data acquisition module. The motion capture data acquisition module is used to convert an optical signal representing finger joint deformation information into a voltage signal and transmit the voltage signal to the motion capture data processing module. The motion capture data processing module is used to process the voltage signal and transmit the processed voltage signal to an upper computer.

Alternatively, the front circuit splint has the same structure as the rear circuit splint, each including a single linear slot and an upper thin plate.

Alternatively, the central circuit splint includes dual linear slots, a middle partition plate, and an upper thin plate.

Alternatively, the first flexible polymer profiled optical fiber has the same shape as the second flexible polymer profiled optical fiber, each being composed of spherical protrusions at both ends and a middle cylindrical line.

Alternatively, one end, close to the spherical protrusion, of the middle cylindrical line of the first flexible polymer profiled optical fiber is fixed into the single linear slot of the front circuit splint, the spherical protrusion at one end of the first flexible polymer profiled optical fiber is fixed after passing through the front circuit splint and protrudes from one end, away from the central circuit splint, of the front circuit splint, and the upper thin plate of the front circuit splint is used to fix one end of the first flexible polymer profiled optical fiber to the front laser emitting plate in a pressing way.

The other end, close to the spherical protrusion, of the middle cylindrical line of the first flexible polymer profiled optical fiber is fixed into one slot of the dual linear slots of the central circuit splint, the spherical protrusion at the other end of the first flexible polymer profiled optical fiber is fixed after passing through the central circuit splint, and protrudes from one end, away from the front circuit splint, of the central circuit splint. One end, close to the spherical protrusion, of the middle cylindrical line of the second flexible polymer profiled optical fiber is fixed into another slot of the dual linear slots of the central circuit splint, the spherical protrusion at one end of the second flexible polymer profiled optical fiber is fixed after passing through the central circuit splint, and protrudes from one end, away from the rear circuit splint, of the central circuit splint. The middle partition plate is provided between two slots of the dual linear slots. The upper thin plate of the central circuit splint is used to fix the other end of the first flexible polymer profiled optical fiber to the laser receiving end of the central laser receiving and emitting board and fix one end of the second flexible polymer profiled optical fiber to the laser emitting end of the central laser receiving and emitting board in a pressing way.

The other end, close to the spherical protrusion, of the middle cylindrical line of the second flexible polymer profiled optical fiber is fixed to the single linear slot of the rear circuit splint, the spherical protrusion at the other end of the second flexible polymer profiled optical fiber is fixed after passing through the rear circuit splint, and protrudes from one end, away from the central circuit splint, of the rear circuit splint. The upper thin plate of the rear circuit splint is used to fix the other end of the second flexible polymer profiled optical fiber to the rear laser emitting board in a pressing way.

Alternatively, the middle cylindrical line of the flexible polymer profiled optical fiber has an outer diameter of 1.5 mm, an optical fiber core diameter of 1 mm, and a length of 5.5 cm to 6 cm; and the spherical protrusion at each of both ends of the flexible polymer profiled optical fiber has a diameter of 2 mm.

Alternatively, the glove packaging tool includes an elastic leather surface mesh, a Velcro tape, and an elastic potting adhesive. The elastic potting adhesive is provided between the elastic leather surface mesh and the Velcro tape; the elastic potting adhesive encapsulates and wraps the corresponding circuit splint; the elastic leather surface mesh is connected to the Velcro tape in a sewing mode. The Velcro tape is attached to a corresponding joint position of the glove body.

Alternatively, the motion capture data processing module includes a power module, a Bluetooth module, and a differential amplifier circuit module. The power module is used to provide power. The differential amplifier circuit module is respectively connected to the motion capture data acquisition module and the Bluetooth module, and is used to perform noise reduction and amplification processing on the voltage signal acquired by the motion capture data acquisition module, transmit the processed voltage signal to the Bluetooth module for wireless data transmission, and transmit a voltage signal representing finger joint deformation information to the upper computer.

Alternatively, the upper computer is used to convert the voltage signal representing the finger joint deformation information into local movement parameters at corresponding bones and joints of a human hand model, and to compile and reproduce a hand motion of a wearer using blueprints.

According to specific embodiments of the present disclosure, the present disclosure has the following technical effects:

The wearable motion capture glove based on a flexible optical fiber includes a glove body, multiple motion acquisition and sensing devices, and a glove packaging tool. Each motion acquisition sensing device includes a data acquisition and processing module, a circuit splint, and a flexible polymer profiled optical fiber. The data acquisition and processing module includes a motion capture data acquisition module, and a motion capture data processing module. The flexible polymer profiled optical fiber and the motion capture data acquisition module are firmly packaged using the circuit splint and the glove packaging tool, and then are fixed to a corresponding position of a finger joint of a wearer, making the glove worn more closely to the finger joint. A space occupancy rate is low, the motion capture data acquisition module is light and convenient to dismount, thus guaranteeing that a user can perform hand activities with multiple degrees of freedom after wearing the motion capture glove, and the data acquisition of the motion capture glove is more stable and accurate. In addition, the flexible polymer profiled optical fiber cooperates with the motion capture data acquisition module and the motion capture data processing module to detect an optical signal representing a curvature of a finger movement with high accuracy, analyze and process the optical signal, and convert the optical signal into a voltage signal representing finger joint deformation information, so as to achieve high-pose restoration of the hand motion of the wearer.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a wearable motion capture glove based on a flexible optical fiber, relating to a motion capture technology with high-pose restoration degree, a flexible polymer optical fiber sensing detection technology, and an unreal engine motion capture technology, so as to achieve accurate and stable acquisition and high-pose restoration of a hand motion and make the hand motion easier and nimbler.

In order to make the objectives, technical solutions and advantages of the present disclosure more clearly, the present disclosure is further described in detail below with reference to the embodiments.

Figure 1:
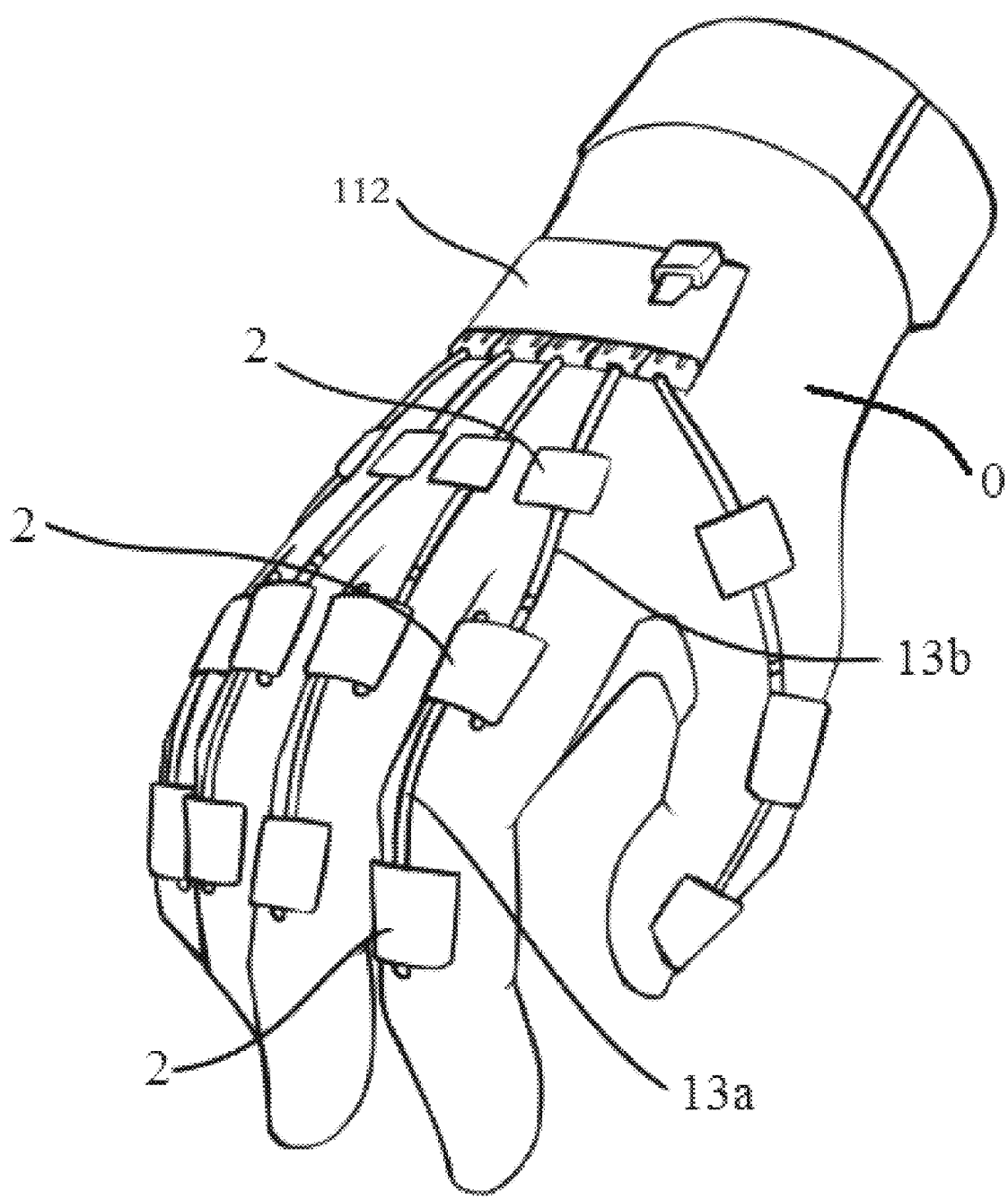
FIG. 1 is a schematic diagram of an overall structure of a wearable motion capture glove based on a flexible optical fiber according to the present disclosure.

FIG. 1 is a schematic diagram of an overall structure of a wearable motion capture glove based on a flexible optical fiber according to the present disclosure. Referring to FIG. 1, the wearable motion capture glove based on a flexible optical fiber specifically includes a glove body 0, multiple motion acquisition and sensing devices, and a glove packaging tool. Each motion acquisition sensing device includes a data acquisition and processing module, a circuit splint, and a flexible polymer profiled optical fiber. The data acquisition and processing module includes a motion capture data acquisition module, and a motion capture data processing module.

Figure 2:
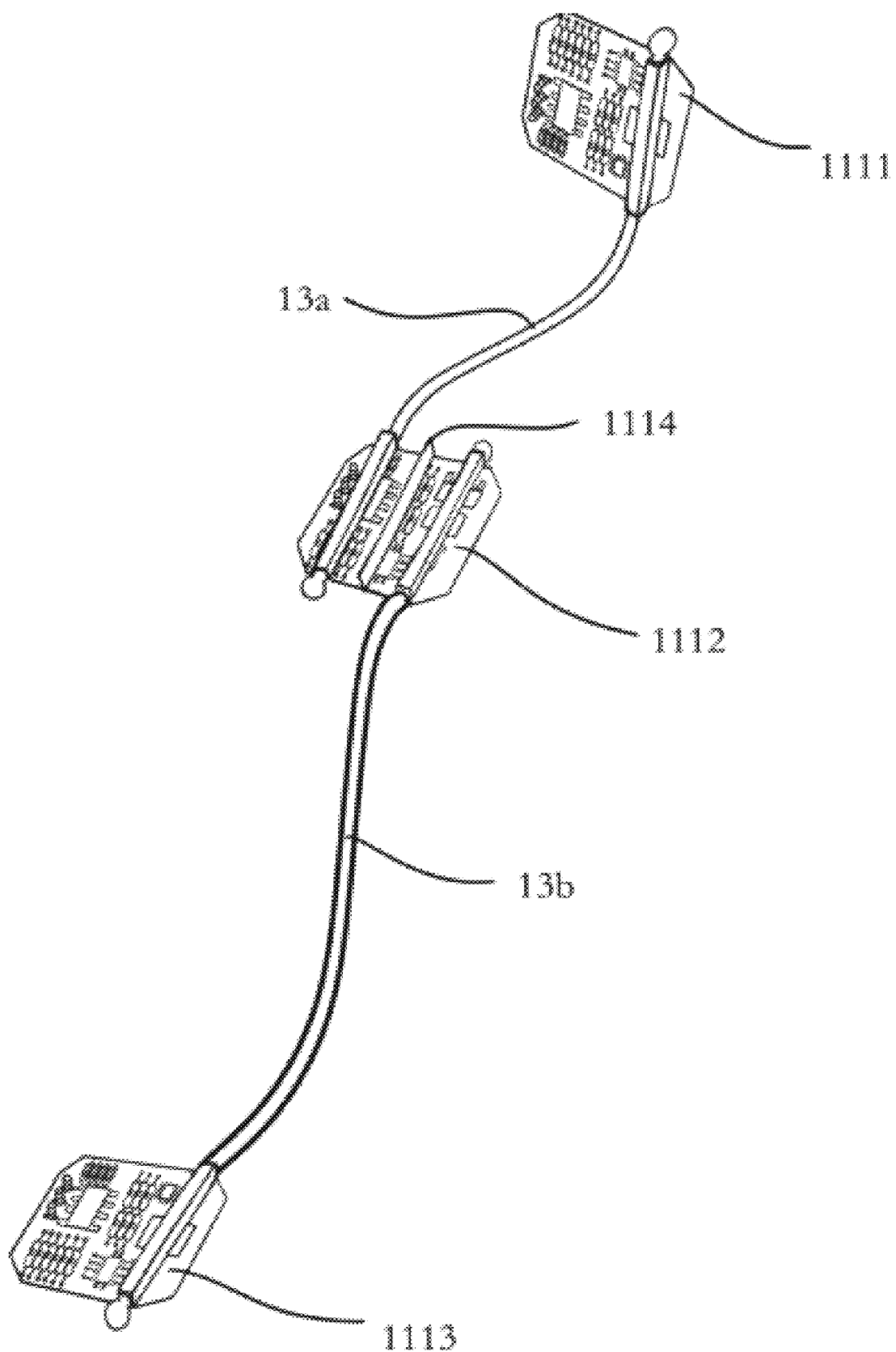
FIG. 2 is a schematic diagram of a connection between a motion capture data acquisition module and a flexible polymer profiled optical fiber according to the present disclosure.

FIG. 2 is a schematic diagram of a connection between a motion capture data acquisition module and a flexible polymer profiled optical fiber according to the present disclosure. As shown in FIG. 2, the motion capture data acquisition module includes a front laser emitting board 1111, a central laser receiving and emitting board 1112, and a rear laser receiving board 1113. Correspondingly, the circuit splint includes a front circuit splint, a central circuit splint, and a rear circuit splint, thus playing a role in fixing the flexible polymer profiled optical fiber and the motion capture data acquisition module. The flexible polymer profiled optical fiber includes a first flexible polymer profiled optical fiber 13a, and a second flexible polymer profiled optical fiber 13b.

Specifically, referring to FIG. 2, one end of the first flexible polymer profiled optical fiber 13a is connected to the front laser emitting board 1111, and the other end of the first flexible polymer profiled optical fiber 13a is connected to a laser receiving end of the central laser receiving and emitting board 1112. One end of the second flexible polymer profiled optical fiber 13b is connected to a laser emitting end of the central laser receiving and emitting board 1112, and the other end of the second flexible polymer profiled optical fiber 13b is connected to the rear laser receiving board 1113.

The front circuit splint is used to fixedly connect one end of the first flexible polymer profiled optical fiber 13a to the front laser emitting board 1111 in a pressing way, and is fixed to a middle phalanx position of the glove body 0 after being packaged by the glove packaging tool 2, as shown in FIG. 1. The central circuit splint is used to fixedly connect the other end of the first flexible polymer profiled optical fiber 13a, the central laser receiving and emitting board 1112 and one end of the second flexible polymer profiled optical fiber 13b in a pressing way, and is fixed to a proximal phalanx position of the glove body 0 after being packaged by the glove packaging tool 2. The rear circuit splint is used to fixedly connect the other end of the second flexible polymer profiled optical fiber 13b to the rear laser receiving board 1113 in a pressing way, and is fixed to a proximal metacarpal head position of metacarpal phalanx of the glove body 0 after being packaged by the glove packaging tool 2.

When performing hand motion capture, the front laser emitting board 1111 emits laser, the laser receiving end of the central laser receiving and emitting board 1112 receives the laser emitted by the front laser emitting board 1111, and the laser emitting end of the central laser receiving and emitting board 1112 emits laser to the rear laser receiving board 1113. The laser emitting end and the laser receiving end of the central laser receiving and emitting board 1112 are separated by a middle partition plate 1114 to prevent interference. The first flexible polymer profiled optical fiber 13a is connected to the front laser emitting board 1111 and the central laser receiving and emitting board 1112, the first flexible polymer profiled optical fiber 13a bends to conduct an optical signal, and the optical signal is converted by the laser receiving end into an electric signal to detect a movement pose of the middle phalanx. The rear laser receiving board 1113 receives the laser emitted by the laser emitting end of the central laser receiving and emitting board 1112. The second flexible polymer profiled optical fiber 13b is connected to the central laser receiving and emitting board 1112 and the rear laser receiving board 1113, the second flexible polymer profiled optical fiber 13b bends to conduct an optical signal, and the optical signal is converted by the rear laser receiving board 1113 into an electric signal to detect a movement pose of the metacarpal phalanx.

Figure 3:
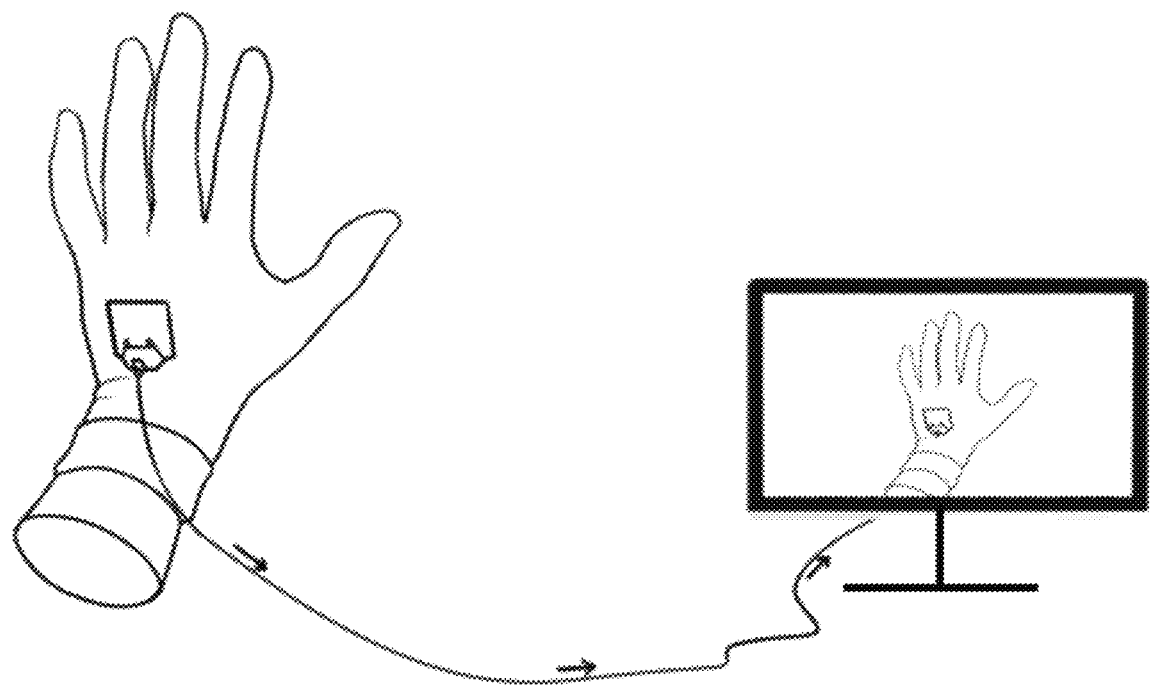
FIG. 3 is a schematic diagram of a wearable motion capture glove based on a flexible optical fiber according to the present disclosure connected to an upper computer.

The motion capture data processing module 112 is connected to the motion capture data acquisition module. The motion capture data acquisition module is used to convert an optical signal representing finger joint deformation information into a voltage signal, and then transmit the voltage signal to the motion capture data processing module 112. The motion capture data processing module 112 is used to process the voltage signal and transmit the processed voltage signal to an upper computer, as shown in FIG. 3.

The wearable motion capture glove based on the flexible optical fiber may include 5-12 motion capture data acquisition modules, and the self-designed and manufactured flexible optical fiber is used as a main sensing unit, such that the wearer can perform hand activities with multiple degrees of freedom easily and nimbly after wearing the motion capture glove. The data acquisition and processing module is fixed stably, and the multi-degree-of-freedom hand motion capture design based on the flexible polymer profiled optical fiber can achieve high-pose restoration, which is convenient for accurate and stable acquisition of hand motion data. The accurate capture of the human action can be achieved using a novel sensor calibration mode, a sensor algorithm, a human action algorithm, and a post-processing algorithm.

Figure 4:
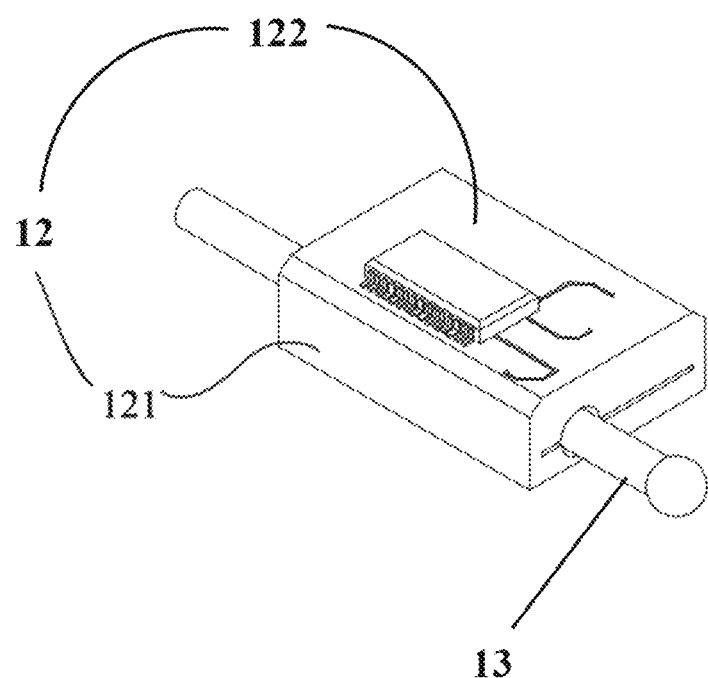
FIG. 4 is a schematic diagram of a connection between a circuit splint and a flexible polymer profiled optical fiber according to the present disclosure.

FIG. 4 is a schematic diagram of a connection between a circuit splint and a flexible polymer profiled optical fiber according to the present disclosure. Referring to FIG. 2 and FIG. 4, the front circuit splint has the same structure as the rear circuit splint, each including a single linear slot 121, and an upper thin plate 122. While the central circuit splint includes dual linear slots, a middle partition plate 1114, and an upper thin plate. The middle partition plate 1114 is used to separate the laser emitting end and the laser receiving end at both sides of the central laser receiving and emitting board 1112 to prevent mutual interference.

Figure 5:
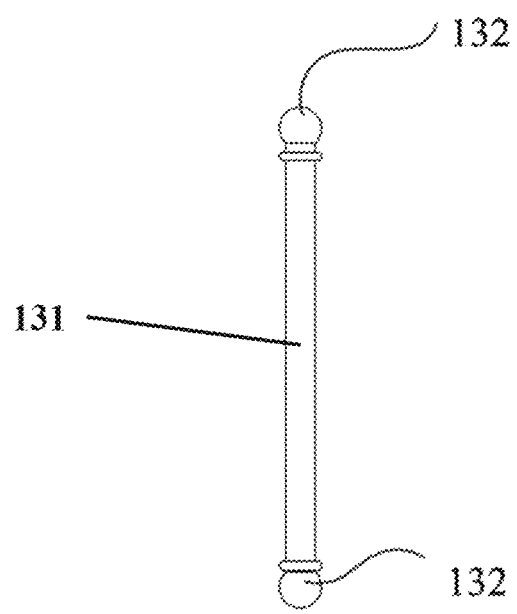
FIG. 5 is a structural schematic diagram of a flexible polymer profiled optical fiber according to the present disclosure.

FIG. 5 is a structural schematic diagram of a flexible polymer profiled optical fiber according to the present disclosure. Referring to FIG. 2 and FIG. 5, the first flexible polymer profiled optical fiber 13a has the same shape as the second flexible polymer profiled optical fiber 13b, each being composed of spherical protrusions 132 at both ends and a middle cylindrical line 131.

A preparation method for the flexible polymer profiled optical fiber includes the following steps: preparing a PDMS (Polydimethylsiloxane) mixed solution from a prepolymer and a curing agent in a mass ratio of m:n, where specific values of m and n depend on the production quantity and required ratio, and then carrying out vacuum defoaming, curing molding and demolding, and bonding demolded two halves of flexible polymer profiled optical fiber completely to obtain the flexible polymer profiled optical fiber. The middle cylindrical line 131 of the flexible polymer profiled optical fiber has an outer diameter of 1.5 mm, an optical fiber core diameter of 1 mm, and a length of 5.5 cm to 6 cm. The spherical protrusion 132 at each of both ends of the flexible polymer profiled optical fiber has a diameter of 2 mm. The flexible polymer profiled optical fiber is connected to the motion capture data acquisition module to conduct the optical signal.

Different from an inertia sensor, the flexible optical fiber provided by the present disclosure is more stable in data transmission after sensitization processing, and can be used to detect a curvature with high accuracy, without being affected by the interference of an external environment and limited by a use site. Moreover, the flexible optical fiber can guarantee long-term continuous motion capture accuracy, and can capture hand movements up to 17 degrees of freedom.

The flexible polymer profiled optical fiber has a minimum identification bending detection accuracy up to 0.0125°, and has softness and high adhesion to human body. Different from an ordinary inertia sensor, when a contact force is applied to a surface of the flexible polymer profiled optical fiber, the strain of the flexible optical fiber continues to increase with the increase of a load, the load and the strain show a good linear relationship, and thus the flexible optical fiber has the advantages of low loss, high light transmittance, high sensitivity to tensile and bending strain response, extremely low elastic modulus, high elasticity and adhesiveness, and is capable of guaranteeing the long-term continuous motion capture accuracy.

According to the present disclosure, the structure of the flexible polymer profiled optical fiber is upgraded, and the flexible optical fiber and the motion capture data acquisition module are fixed using the circuit splint 12 to detect the curvature with high accuracy, thus achieving stable and high-accuracy capture of the hand motion of the human body.

Referring to FIG. 1, FIG. 2 and FIG. 5, one end, close to the spherical protrusion, of the middle cylindrical line of the first flexible polymer profiled optical fiber 13a is fixed into the single linear slot 121 of the front circuit splint, the spherical protrusion at one end of the first flexible polymer profiled optical fiber 13a is fixed after passing through the front circuit splint and protrudes from one end, away from the central circuit splint, of the front circuit splint, and the upper thin plate 122 of the front circuit splint is used to fix one end of the first flexible polymer profiled optical fiber 13a to the front laser emitting plate 1111 in a pressing way.

The other end, close to the spherical protrusion, of the middle cylindrical line of the first flexible polymer profiled optical fiber 13a is fixed into one of the dual linear slots of the central circuit splint, the spherical protrusion at the other end of the first flexible polymer profiled optical fiber 13a is fixed after passing through the central circuit splint, and protrudes from one end, away from the front circuit splint, of the central circuit splint.

One end, close to the spherical protrusion, of the middle cylindrical line of the second flexible polymer profiled optical fiber 13b is fixed into another slot of the dual linear slots of the central circuit splint, the spherical protrusion at one end of the second flexible polymer profiled optical fiber 13b is fixed after passing through the central circuit splint, and protrudes from one end, away from the rear circuit splint, of the central circuit splint. The middle partition plate 1114 is provided between two slots of the dual linear slots. The upper thin plate of the central circuit splint is used to fix the other end of the first flexible polymer profiled optical fiber to the laser receiving end of the central laser receiving and emitting board and fix one end of the second flexible polymer profiled optical fiber to the laser emitting end of the central laser receiving and emitting board in a pressing way.

The other end, close to the spherical protrusion, of the middle cylindrical line of the second flexible polymer profiled optical fiber 13b is fixed to the single linear slot 121 of the rear circuit splint, the spherical protrusion at the other end of the second flexible polymer profiled optical fiber 12b is fixed after passing through the rear circuit splint, and protrudes from one end, away from the central circuit splint, of the rear circuit splint, and the upper thin plate 122 of the rear circuit splint is used to fix the other end of the second flexible polymer profiled optical fiber 13b to the rear laser emitting board in a pressing way.

The front laser emitting board 1111, the central laser receiving and emitting board 1112 and the rear laser receiving board 1113 each are correspondingly provided with a circuit splint 12. The front laser emitting board 1111 is fixed by the front circuit splint in pressing way, the central laser receiving and emitting board 1112 is fixed by the central circuit splint in a pressing way, and the rear laser receiving board 1113 is fixed by the rear circuit splint in a pressing way. The spherical protrusions 132 at both ends of the first flexible polymer profiled optical fiber 13a respectively pass through the front circuit splint and the central circuit splint for connecting the front laser emitting board 1111 and the laser receiving end of the central laser receiving and emitting board 1112. The spherical protrusions 132 at both ends of the second flexible polymer profiled optical fiber 13b respectively pass through the central circuit splint and the rear circuit splint for connecting the laser emitting end of the central laser receiving and emitting board 1112 and the rear laser receiving and emitting board 1113. The upper thin plate 122 of the circuit splint 12 and the linear slot 121 are used to connect the flexible polymer profiled optical fiber and the motion capture data acquisition module in a pressing way. The middle cylindrical line of the flexible polymer profiled optical fiber is fixed to the linear slot of the circuit splint, the spherical protrusions at both ends of the flexible polymer profiled optical fiber are fixed after passing through the circuit splints and then protrude from both ends of the circuit splints, such that the flexible polymer profiled optical fiber and the motion capture data acquisition module are bound by the circuit splint to form a unified whole.

Figure 6:
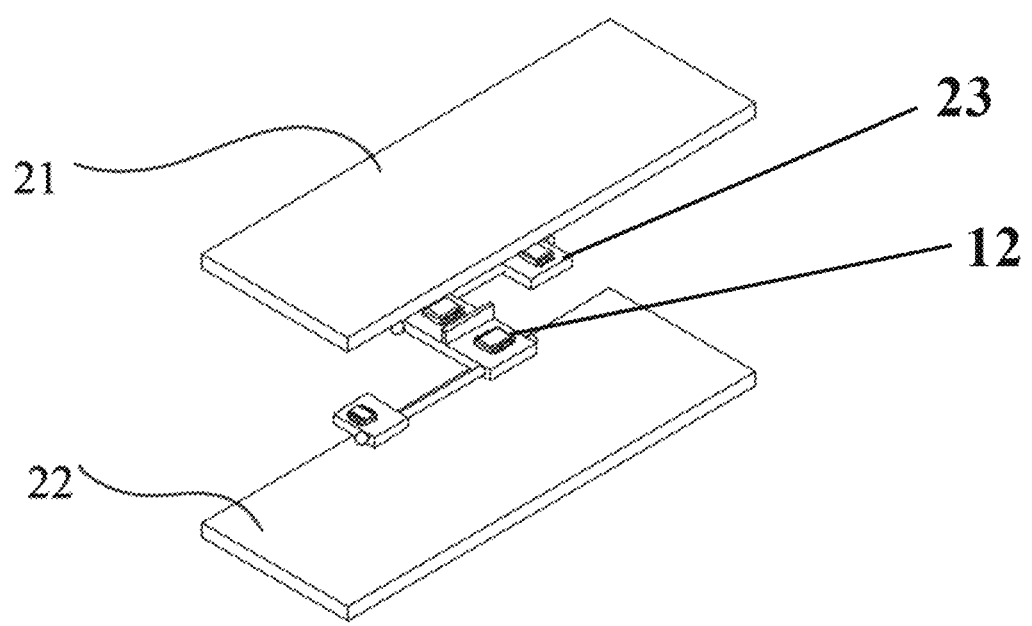
FIG. 6 is a schematic diagram of a glove packaging tool and an internal structure thereof according to the present disclosure.

FIG. 6 is a schematic diagram of a glove packaging tool and an internal structure thereof according to the present disclosure. Referring to FIG. 6, the glove packaging tool 2 includes an elastic leather surface mesh 21, a Velcro tape 22, and an elastic potting adhesive 23. The elastic potting adhesive 23 is provided between the elastic leather surface mesh 21 and the Velcro tape 22; the elastic potting adhesive 23 encapsulates and wraps the corresponding circuit splint 12; the elastic leather surface mesh 21 is connected to the Velcro tape 22 in a sewing mode. The Velcro tape 22 is attached to a corresponding joint position of the glove body 0.

Specifically, the front laser emitting board 1111 wrapped by the elastic leather surface mesh 21 and the Velcro tape 22 corresponds to the middle phalanx of the wearer, the central laser receiving and emitting board 1112 corresponds to the proximal phalanx of the wearer, and the rear laser receiving board 1113 corresponds to the proximal metacarpal head of metacarpal phalanx of the wearer. The front laser emitting board 1111 and the laser receiving end of the central laser receiving and emitting board 1112 are connected to the first flexible polymer profiled optical fiber 13a. The laser emitting end of the central laser receiving and emitting board 1112 and the rear laser receiving board 1113 are fixedly connected to the second flexible polymer profiled optical fiber 13b.

The elastic leather surface mesh 21 made of an elastic leather material can be used as an outer surface of the wearable motion capture glove, and the Velcro tape 22 is used as a bottom plate to support the motion capture data acquisition module above the finger joint, so as to adapt to the motion change of human hand and achieve the high-pose restoration of hand motion. The overlock sewing is used to fix the elastic leather surface mesh 21 and the Velcro tape body 22. The motion capture data acquisition module connected to the flexible polymer profiled optical fiber is packaged into the glove packaging tool 2, and then is fixed between the elastic leather surface mesh 21 and the Velcro tape 22 using the circuit splint 12; and the elastic potting adhesive 23 is injected for overall packaging and fixation. The flexible polymer profiled optical fiber and the motion capture data acquisition module can be stably fixed by the elastic potting adhesive 23.

The elastic leather material of the elastic leather surface mesh 21 is elastic and waterproof, the use of the Velcro tape 22 makes the novel glove packaging tool 2 easy to be dismounted from the surface of the glove body, and the hand motion can be easier and nimbler on the basis of human skin pressure comfort. The motion capture data acquisition module connected to the flexible polymer profiled optical fiber is clamped between the elastic leather surface mesh 21 and the Velcro tape 22, and then the elastic potting adhesive 23 is injected. The elastic potting adhesive 23 has high elasticity, so as to adapt to hand motion change and stably fix the flexible polymer profiled optical fiber and the motion capture data acquisition module.

The flexible polymer profiled optical fiber and the motion capture data acquisition module wrapped by the elastic leather surface mesh 21 and the Velcro tape 22 correspond to the finger joint of the wearer. As the distal phalanx and the middle phalanx of the human finger are biologically linked, the front laser emitting board, the central laser receiving and emitting board and the rear laser receiving board of the motion capture data acquisition module are respectively placed at the middle phalanx, the proximal phalanx and the metacarpal head of the wearer, such that the hand motion of the human body can be accurately captured to achieve high-pose restoration.

The circuit splint 12 for fixing the motion capture data acquisition module is placed into the glove packaging tool 2, the elastic potting adhesive 23 is filled and packaged between the Velcro tape 21 and the elastic leather 22 at the outer surface, and then the glove packaging tool 2 is fixed to the finger joint above the corresponding finger joint of the wearer with the Velcro tape 21. The bending of the finger joint of the wearer causes the deformation of the flexible polymer profiled optical fiber. After receiving a laser signal, the motion capture data acquisition module converts deformation data of the flexible polymer profiled optical fiber into a voltage signal, which represents motion data of the hand movement of the wearer. The motion capture data processing module is used to wirelessly transmit hand pose data of the human body to the upper computer for processing, so as to achieve hand motion capture.

The elastic leather surface mesh 21 and the Velcro tape 22 are fixed in an overlock sewing mode. The elastic potting adhesive 23 is filled between the elastic leather surface mesh 21 and the Velcro tape 22 for fixing the flexible polymer profiled optical fiber and the connected motion capture data acquisition module, such that the flexible polymer profiled optical fiber and the connected motion capture data acquisition module can be stably fixed into the motion capture glove to achieve more accurate acquisition of hand data and achieve high-pose restoration.

The elastic leather surface mesh 21 and the Velcro tape 22 in the glove packaging tool 2 are located on the outer surface of the wearable motion capture glove for supporting and packaging the motion capture data acquisition module, without affecting the accuracy of the motion capture data acquisition module. A pasting position of the glove packaging tool 2 corresponds to the finger joint of the wearer, and the flexible polymer profiled optical fiber and the connected motion capture data acquisition module wrapped by the elastic leather surface mesh 21 and the Velcro tape 22 correspond to the finger joint of the wearer, thus achieving integrated data acquisition with low power consumption.

The motion capture data processing module is used to convert the obtained deformation data of the flexible polymer profiled optical fiber into a voltage signal via an interface, wirelessly transmit the data to the upper computer for processing. The motion capture glove is plugged into a USB port of the computer, so as to achieve hand motion capture using the new sensor calibration method, the sensor algorithm, the human motion algorithm and the post-processing algorithm.

Figure 7:
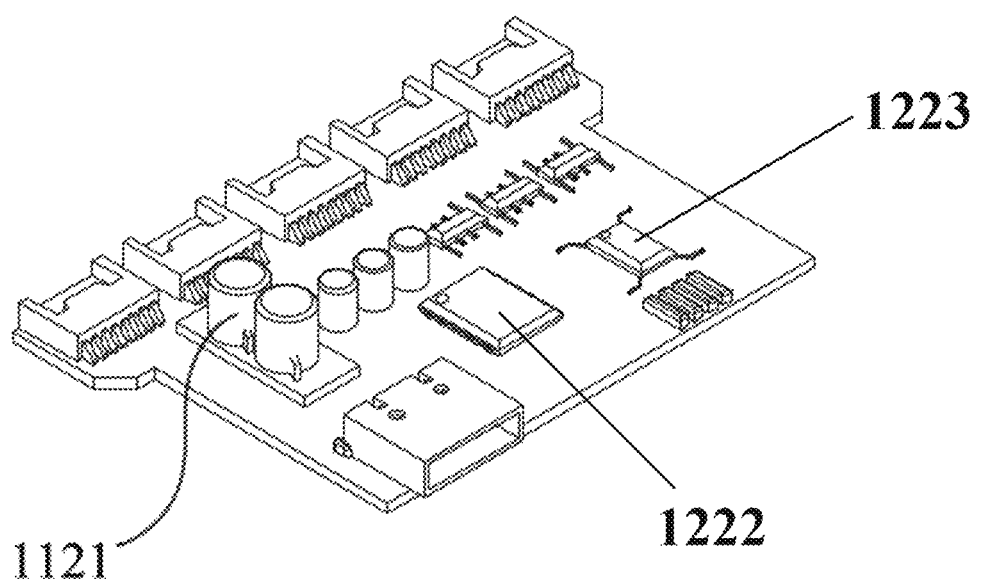
FIG. 7 is a structural schematic diagram of a circuit board of a motion capture data processing module according to the present disclosure.

FIG. 7 is a structural schematic diagram of a circuit board of a motion capture data processing module according to the present disclosure. Referring to FIG. 1 and FIG. 7, the motion capture data processing module is fixed to an upper end of capitate of the glove body 0, and is connected to the rear laser receiving plate 1113 in the motion capture data acquisition module through a flat cable. Specifically, the motion capture data processing module includes a power module 1121, a Bluetooth module 1122, and a differential amplifier circuit module 1123. The power module 1121 is used to provide power. The differential amplifier circuit module 1123 is respectively connected to the motion capture data acquisition module and the Bluetooth module 1122, and is used to perform noise reduction and amplification processing on the voltage signal acquired by the motion capture data acquisition module, and transmit the processed voltage signal to the Bluetooth module 1122 for wireless data transmission, and transmit the voltage signal representing the finger joint deformation information to the upper computer.

The motion capture data processing module adopts a self-developed integrated circuit design. A main chip employs a dual-kernel 32-bit MCU, a 2.4 GHZ dual-mode Wi-Fi, and a Bluetooth chip, the main frequency is as high as 230 MHZ, and the computing power can reach 600 DMIPS. A laser diode, a differential amplifier circuit module 1123, a power management module 1121, a Bluetooth module 1122 and a serial communication module are integrated into a whole. The differential amplifier circuit module is used for signal amplification using AD706ARZ, and the Bluetooth module 1122 is to apply a built-in Bluetooth 5.2 module of an ESPS3 Internet of Things chip.

The optical signal obtained by bending the flexible optical fiber is converted into a weak electrical signal by the motion capture data acquisition module, and the differential amplifier circuit module 1123 receives the weak electrical signal for noise reduction and amplification, and the voltage signal after noise reduction and amplification is wirelessly transmitted to the upper computer through a UDP (User Datagram Protocol). The serial communication module is responsible for receiving data and transmitting instructions.

The upper computer is used to receive the voltage data collected by the motion capture data acquisition module through UDP protocol wireless data transmission, and to convert the voltage signal representing the finger joint deformation information into local movement parameters at corresponding bones and joints of a human hand model, and to compile and reproduce the hand motion of the wearer using the blueprint.

In an upper computer unreal engine, a standard SkeletalMesh human skeleton model is used, and by combining a hand skeleton mesh component and a character blueprint, an electrical signal data collected by the motion acquisition and sensing device is received through UDP wireless data transmission, and then the electrical signal data is converted into local movement parameters of the corresponding bones and joints of the human hand model, and the local movement parameters are compiled using the blueprint to reproduce the hand motion of the wearer.

According to the wearable motion capture glove based on a flexible optical fiber, the cylindrical line of the flexible polymer profiled optical fiber is fixed into the linear slot of the circuit splint, the spherical protrusions at both ends of the flexible polymer profiled optical fiber are fixed after passing through the circuit splints and protrude from both ends of the circuit splints, the upper thin plate of the circuit splint is used to fix the flexible polymer profiled optical fiber and the motion capture data acquisition module in a pressing way, and the motion capture data processing module is connected to the rear laser receiving board in the motion capture data acquisition module by a flat cable, such that the flexible polymer profiled optical fiber and the data acquisition processing module are bound to form a unified whole. The formed motion capture data acquisition module is placed into the glove packaging tool, the elastic potting adhesive is used for filling and packaging between the Velcro tape and the elastic leather surface mesh on the outer surface, and then the glove packaging tool is fixed to each of the middle phalanx, proximal phalanx and metacarpal phalanx of the glove body of the wearer with the Velcro tape. The bending of the finger joint of the wearer makes the flexible polymer profiled optical fiber generate deformation, which is acquired by the motion capture data acquisition module, and deformation data is converted into a voltage signal for processing in the motion capture data processing module, so as to obtain motion data of the hand movement of the wearer. The acquired human movement data are processed in the upper computer using the novel sensor calibration method, the sensor algorithm, the human motion algorithm and the post-processing algorithm, so as to achieve accurate capture of human motion. Specifically, the data is wirelessly transmitted to the upper computer for processing, and the glove is inserted into the USB port of the computer to achieve motion capture.

According to the wearable motion capture glove based on a flexible optical fiber and a system thereof, the spherical protrusions at both ends of the flexible polymer special-shaped optical fiber are respectively clamped into the linear slots through the circuit splints, so as to play a role in fixedly connecting the optical fiber to the motion capture data acquisition module. The elastic potting adhesive is provided between the elastic leather surface mesh and the Velcro tape, and the motion capture data acquisition module and the flexible polymer profiled optical fiber are fixed in the elastic potting adhesive, and the motion capture data acquisition module wrapped by the elastic leather surface mesh and the Velcro tape corresponds to the finger joint of the wearer. The bending of the finger joint of the wearer makes the flexible polymer profiled optical fiber generate deformation, which is collected by the motion capture data acquisition module, and the deformation data is converted into a voltage signal in the motion capture data acquisition module for processing, such that the motion capture data processing module can obtain the motion data of the hand movement of the wearer. The motion data is subjected to noise reduction and amplification after being acquired by the laser diode, and is wirelessly transmitted to the terminal through the UDP after processing, and the data is wirelessly transmitted to the upper computer for processing by a fusion algorithm, so as to achieve motion capture. According to the wearable motion capture glove based on the flexible optical fiber, the hand motion of the wearer is ensured to be easy and nimble, the fixing mode of the data acquisition and processing module is stable, multi-degree-of-freedom hand motion capture can be achieved based on the flexible polymer profiled optical fiber, and the design of a novel glove packaging tool is convenient for accurate and stable acquisition of hand motion data, thereby achieve high-pose restoration of the hand of the wearer.

Various embodiments in this specification are described in a progressive way, and each embodiment focuses on the differences from other embodiments, so it is only necessary to refer to the same and similar parts between each embodiment.

Specific examples are used herein for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A wearable motion capture glove based on a flexible optical fiber, the wearable motion capture glove comprising a glove body, a plurality of motion acquisition and sensing devices, and a glove packaging tool, wherein each motion acquisition and sensing device individually comprises a data acquisition and processing module, a circuit splint, and a flexible polymer profiled optical fiber;

the data acquisition and processing module comprises a motion capture data acquisition module, and a motion capture data processing module; the motion capture data acquisition module comprises a front laser emitting board, a central laser receiving and emitting board, and a rear laser receiving board; the circuit splint comprises a front circuit splint, a central circuit splint, and a rear circuit splint; the flexible polymer profiled optical fiber comprises a first flexible polymer profiled optical fiber, and a second flexible polymer profiled optical fiber;

one end of the first flexible polymer profiled optical fiber is connected to the front laser emitting board, and the other end of the first flexible polymer profiled optical fiber is connected to a laser receiving end of the central laser receiving and emitting board; one end of the second flexible polymer profiled optical fiber is connected to a laser emitting end of the central laser receiving and emitting board, and the other end of the second flexible polymer profiled optical fiber is connected to the rear laser receiving board;

the front circuit splint is used to fixedly connect one end of the first flexible polymer profiled optical fiber to the front laser emitting board in a pressing way, and is fixed to a middle phalanx position of the glove body after being packaged by the glove packaging tool; the central circuit splint is used to fixedly connect the other end of the first flexible polymer profiled optical fiber, the central laser receiving and emitting board and one end of the second flexible polymer profiled optical fiber in a pressing way, and is fixed to a proximal phalanx position of the glove body after being packaged by the glove packaging tool; and the rear circuit splint is used to fixedly connect the other end of the second flexible polymer profiled optical fiber to the rear laser receiving board in a pressing way, and is fixed to a proximal metacarpal head position of metacarpal phalanx of the glove body after being packaged by the glove packaging tool;

the motion capture data processing module is connected to the motion capture data acquisition module; the motion capture data acquisition module is used to convert an optical signal representing finger joint deformation information into a voltage signal and transmit the voltage signal to the motion capture data processing module; and the motion capture data processing module is used to process the voltage signal and transmit the processed voltage signal to an upper computer.

2. The wearable motion capture glove based on a flexible optical fiber according to claim 1, wherein the front circuit splint has the same structure as the rear circuit splint, each individually comprising a single linear slot and an upper thin plate.

3. The wearable motion capture glove based on a flexible optical fiber according to claim 2, wherein the central circuit splint comprises dual linear slots, a middle partition plate, and an upper thin plate.

4. The wearable motion capture glove based on a flexible optical fiber according to claim 3, wherein the first flexible polymer profiled optical fiber has the same shape as the second flexible polymer profiled optical fiber, each being individually composed of spherical protrusions at both ends and a middle cylindrical line.

5. The wearable motion capture glove based on a flexible optical fiber according to claim 4, wherein one end, close to the spherical protrusion, of the middle cylindrical line of the first flexible polymer profiled optical fiber is fixed into the single linear slot of the front circuit splint, the spherical protrusion at one end of the first flexible polymer profiled optical fiber is fixed after passing through the front circuit splint and protrudes from one end, away from the central circuit splint, of the front circuit splint, and the upper thin plate of the front circuit splint is used to fix one end of the first flexible polymer profiled optical fiber to the front laser emitting plate in a pressing way;

the other end, close to the spherical protrusion, of the middle cylindrical line of the first flexible polymer profiled optical fiber is fixed into one of the dual linear slots of the central circuit splint, the spherical protrusion at the other end of the first flexible polymer profiled optical fiber is fixed after passing through the central circuit splint, and protrudes from one end, away from the front circuit splint, of the central circuit splint; one end, close to the spherical protrusion, of the middle cylindrical line of the second flexible polymer profiled optical fiber is fixed into another slot of the dual linear slots of the central circuit splint, the spherical protrusion at one end of the second flexible polymer profiled optical fiber is fixed after passing through the central circuit splint, and protrudes from one end, away from the rear circuit splint, of the central circuit splint; the middle partition plate is provided between two slots of the dual linear slots; the upper thin plate of the central circuit splint is used to fix the other end of the first flexible polymer profiled optical fiber to the laser receiving end of the central laser receiving and emitting board and fix one end of the second flexible polymer profiled optical fiber to the laser emitting end of the central laser receiving and emitting board in a pressing way;

the other end, close to the spherical protrusion, of the middle cylindrical line of the second flexible polymer profiled optical fiber is fixed to the single linear slot of the rear circuit splint, the spherical protrusion at the other end of the second flexible polymer profiled optical fiber is fixed after passing through the rear circuit splint, and protrudes from one end, away from the central circuit splint, of the rear circuit splint, and the upper thin plate of the rear circuit splint is used to fix the other end of the second flexible polymer profiled optical fiber to the rear laser emitting board in a pressing way.

6. The wearable motion capture glove based on a flexible optical fiber according to claim 4, wherein the middle cylindrical line of the flexible polymer profiled optical fiber has an outer diameter of 1.5 mm, an optical fiber core diameter of 1 mm, and a length of 5.5 cm to 6 cm; and the spherical protrusion at each of both ends of the flexible polymer profiled optical fiber has a diameter of 2 mm.

7. The wearable motion capture glove based on a flexible optical fiber according to claim 1, wherein the glove packaging tool comprises an elastic leather surface mesh, a Velcro tape, and an elastic potting adhesive; the elastic potting adhesive is provided between the elastic leather surface mesh and the Velcro tape; the elastic potting adhesive encapsulates and wraps the corresponding circuit splint; the elastic leather surface mesh is connected to the Velcro tape in a sewing mode; and the Velcro tape is attached to a corresponding joint position of the glove body.

8. The wearable motion capture glove based on a flexible optical fiber according to claim 1, wherein the motion capture data processing module comprises a power module, a Bluetooth module, and a differential amplifier circuit module; the power module is used to provide power; the differential amplifier circuit module is respectively connected to the motion capture data acquisition module and the Bluetooth module, and is used to perform noise reduction and amplification processing on the voltage signal acquired by the motion capture data acquisition module, transmit the processed voltage signal to the Bluetooth module for wireless data transmission, and transmit a voltage signal representing finger joint deformation information to the upper computer.

9. The wearable motion capture glove based on a flexible optical fiber according to claim 1, wherein the upper computer is used to convert the voltage signal representing the finger joint deformation information into local movement parameters at corresponding bones and joints of a human hand model, and to compile and reproduce a hand motion of a wearer using blueprints.

\* \* \* \* \*